United States Patent [19]
Hotta et al.

[11] Patent Number: 5,109,109
[45] Date of Patent: Apr. 28, 1992

[54] PROCESS FOR PRODUCING AROMATIC OR HETEROCYCLIC POLYMER WITH METAL HALIDES

[75] Inventors: Shu Hotta; Mamoru Soga; Nobuo Sonoda, all of Osaka, Japan

[73] Assignee: Matsushita Electric Industrial Co., Ltd., Japan

[21] Appl. No.: 625,681

[22] Filed: Dec. 12, 1990

Related U.S. Application Data

[63] Continuation of Ser. No. 308,089, Feb. 9, 1989, abandoned.

[30] Foreign Application Priority Data

Feb. 9, 1988 [JP] Japan .................................. 63-27979

[51] Int. Cl.$^5$ ............................................. C08G 61/12
[52] U.S. Cl. .................................... 528/378; 528/380; 528/403; 528/412; 528/416; 528/423
[58] Field of Search ............... 528/378, 380, 403, 412, 528/417, 416, 422, 423

[56] References Cited

U.S. PATENT DOCUMENTS

| | | | |
|---|---|---|---|
| 2,457,079 | 12/1948 | Zienty | 549/81 |
| 2,891,966 | 6/1959 | Vesley | 549/81 |
| 3,418,259 | 12/1968 | Kennedy | 528/397 |
| 3,634,339 | 1/1972 | Aylies | 528/397 |
| 4,521,589 | 6/1985 | Yamamoto | 528/380 |

FOREIGN PATENT DOCUMENTS 2502041 7/1976 Fed. Rep. of Germany .

OTHER PUBLICATIONS

Chem Abst, 105, 42436.
Chemical Abstract, vol. 101, No. 18, Oct. 29, 1984, p. 28, abstract no. 152752p, Columbus, Ohio, U.S.; F. Andreani et al.: "Synthesis and electric properties of new thiophene polymers", Comportamento Elettr. Meter. Polim., Giornete Stud. 1984, 313–14.
Japanese Journal of Applied Physics/Part 2: Letters, vol. 26, No. 6, Jun. 1987, pp. L1038–L1039, Tokyo, JP; Yoshino et al.: "Fusibility of polythiophene derivatives with substituted long alkyl chain and their properties".

Primary Examiner—Christopher Henderson
Attorney, Agent, or Firm—Lowe, Price, LeBlanc & Becker

[57] ABSTRACT

A process for producing aromatic polymers which comprise subjecting halogenated aromatic compounds or combinations of aromatic compounds and polyhalogenated aromatic compounds to dehydrohalogenation reaction in the presence of a metal halide for condensation. The halogenated aromatic compounds, aromatic compounds and polyhalogenated aromatic compounds include not only those compounds having benzene nucleus or nuclei, but also compounds of aromatic character such as heterocyclic five-membered compounds. A high degree of polymerization is attained according to the process.

8 Claims, 3 Drawing Sheets

PROCESS FOR PRODUCING AROMATIC OR HETEROCYCLIC POLYMER WITH METAL HALIDES

This application is a continuation of application Ser. No. 07/308,089 filed Feb. 9, 1989 now abandoned.

BACKGROUND OF THE INVENTION

1. Field of the Invention

This invention relates to a process for producing aromatic or heterocyclic polymer compounds which are useful in various fields of electronics and optical electronics.

2. Description of The Prior Art

Attempts have been heretofore made to the production of aromatic polymer compounds which are particularly useful in electronics. For instance, there is known a process of the preparation of aromatic polymers by condensation of metal halides derived from aromatic compounds in the presence of a nickel compound catalyst (T. Yamamoto et al., J. Polym. Sco., Polym. Lett. Ed.. 18, 9 (1980)). Another process of directly oxidizing aromatic compounds with iron (II) chloride is also known (R. Sugimoto et al., Chem. Express, 1, 635 (1986)).

In the field of organic synthesis, studies have been made on the Friedel-Crafts reaction where aromatic compounds and alkyl halides are condensed in the presence of metal halides to obtain alkylated aromatic compounds.

These prior art processes have, however, the drawback that the resultant aromatic polymer compounds have usually only a small degree of polymerization and do not exhibit desirable physical properties. For instance, according to the Yamamoto et al., the production of a compound of the following formula (A) by addition of Mg to 2,5-dibromothiophene in a quantitative manner is difficult.

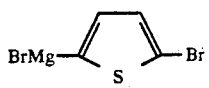
(A)

The dibromothiophene may remain unreacted owing to the deficiency of Mg, or a bis(bromomagnesium) product may be secondarily produced in excess of Mg. Thus, the compound (A) cannot be obtained in a stoichiometric amount in most cases.

SUMMARY OF THE INVENTION

It is accordingly an object of the invention to provide a process for producing aromatic polymer compounds with a high degree of polymerization which can solve the problems involved in the prior art processes.

It is another object of the invention to provide for producing aromatic polymer compounds which can be carried out simply and efficiently to obtain high molecular weight aromatic polymer compounds.

In accordance with one embodiment of the invention, there is provided a process for producing an aromatic polymer compound which comprises subjecting a halogenated aromatic compound to dehydrohalogenation in the presence of a metal halide under conditions sufficient to cause condensation reaction of the halogenated aromatic compound to obtain a polymer product of the aromatic compound. The term "halogenated aromatic compound" used herein is intended to mean halogen-substituted organic compounds having aromatic character. In this sense, the halogenated aromatic compounds include not only aromatic halides having benzene nucleus or nuclei, but also those compounds having heterocyclic five-membered nuclei or rings, e.g. thiophene, furan and pyrrole. The term "aromatic" is used herein as including heterocyclic five-membered compounds with aromatic character as well as so-called aromatic compounds. In the present invention, the halogenated aromatic compounds mean those compounds which have an aromatic or heterocyclic five-membered nucleus and at least one active hydrogen atom and at least one halogen atom directly bonded to the nucleus. As a matter of course, those compounds having two or more aromatic nuclei directly bonded or condensed together and satisfying the above requirement may also be used as the halogenated aromatic compound in the practice of the invention.

According to another embodiment of the invention, there is also provided a process for producing an aromatic polymer compound which comprises subjecting an aromatic compound and a polyhalogenated aromatic compound to dehydrohalogenation reaction in the presence of a metal halide under conditions sufficient to cause the condensation reaction between the aromatic compound and the polyhalogenated aromatic compound to obtain a polycondensation product of the two compounds. The term "aromatic" used in this embodiment has the same meaning as defined with respect to the halogenated aromatic compound. Thus, the aromatic compounds used for the above purposes include not only ordinary aromatic compounds having a benzene nucleus or nuclei, but also heterocyclic five-membered compounds of the aromatic character or aromaticity. The aromatic compounds of the invention are those compounds which have an aromatic or heterocyclic five-membered nucleus and at least two active hydrogen atoms directly bonded to the nucleus. With the aromatic compounds other than the heterocyclic compounds, those compounds having two or more aromatic nuclei bonded or condensed together may also be used in the present invention. The organic polyhalide compounds are those compounds which have an aromatic or heterocyclic nucleus and at least two halogen atoms directly bonded to the nucleus. In this case, aromatic compounds having two or more aromatic nuclei bonded or condensed together may also be used in the present invention provided that the above requirement is satisfied.

The condensation reaction of the above embodiments is usually carried out in an solvent under suitable temperature conditions for a sufficient time.

DETAILED DESCRIPTION OF THE INVENTION

Figure 1:
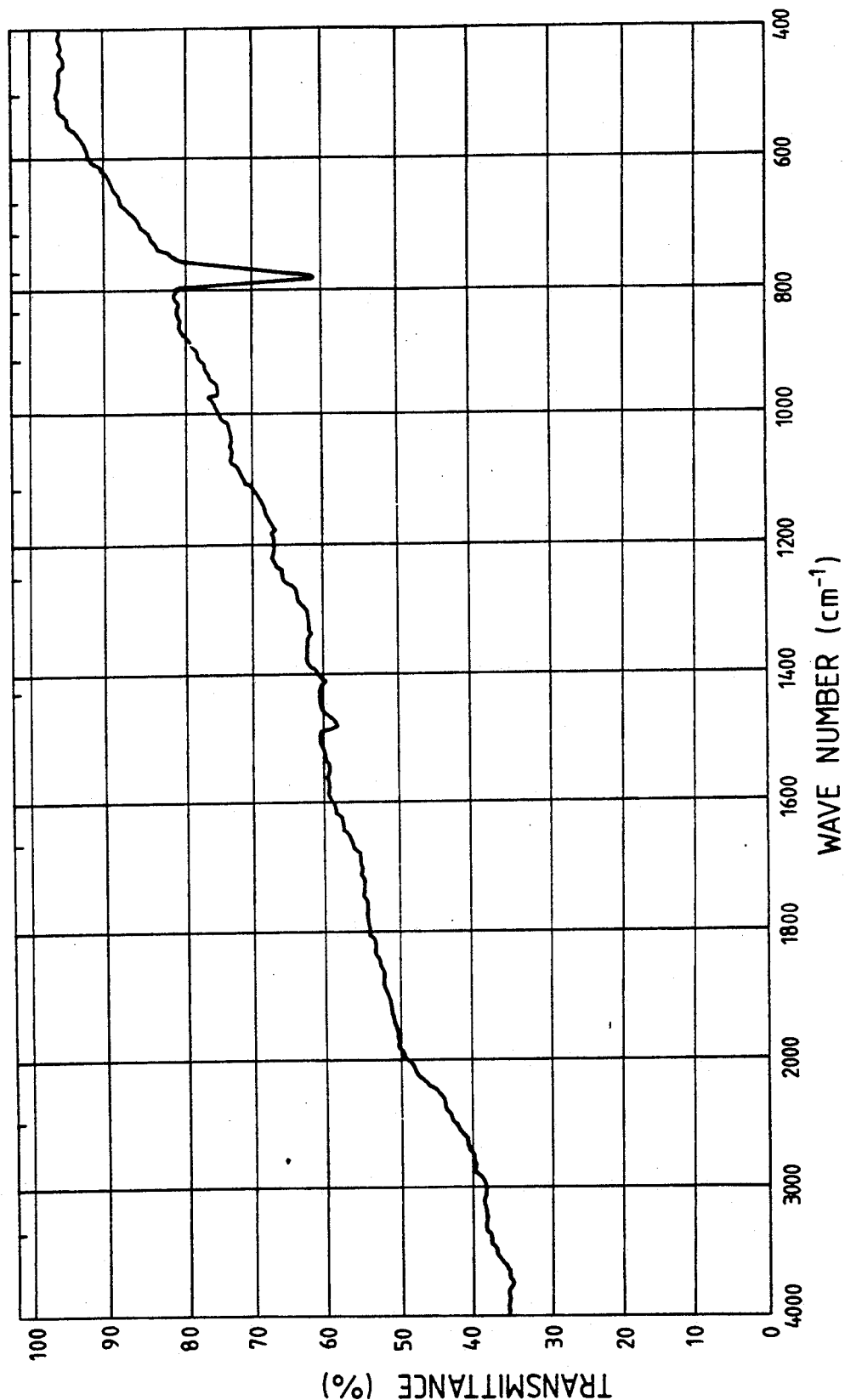
FIGS. 1 to 3 are, respectively, infrared spectrum charts of polythiophene products obtained in examples.

In the process of the invention, the halogenated aromatic compounds defined before or combinations of the defined aromatic compounds and polyhalogenated aromatic compounds are subjected to dehydrohalogenation reaction to cause polycondensation of the halogenated aromatic compound or the combination.

The halogenated aromatic compounds used in the practice of the invention should be, as defined before, aromatic compounds which have an aromatic nucleus or aromatic nuclei directly bonded together or condensed and which have at least one active hydrogen atom and at least one halogen atom, both bonded to the aromatic nucleus or nuclei. The halogenated aromatic compounds may have substituents other than the at least halogen. The aromatic nucleus or nuclei include, for example, aromatic nuclei of benzene, biphenyl, naphthalene, anthracene, azulene and indole with or without substituents other than halogens, and heterocyclic five-membered nuclei of thiophene, pyrrole, furan, selenophene, terullophene with or without substituents other than halogens. Such substituents may be an alkyl group, an alkoxy group, a benzyl group and the like. It will be noted that the halogen used above includes chlorine, bromine and iodine. In a specific case, the halogen may include fluorine.

The active hydrogen used herein is hydrogen which is reactive. For instance, with compounds having a benzene nucleus, hydrogen atoms joined directly to the benzene nucleus are included within the category of the active hydrogen. When a benzene nucleus is substituted with an alkyl or alkoxy group, the hydrogen atom at the ortho or para position is active hydrogen. Similarly, the hydrogen atom at the ortho or para position with respect to a halogen substituent is also active hydrogen. In addition, with heterocyclic five-membered nucleus such as a thiophene nucleus, the hydrogen atom joined at the α position with respect to the hetero-atom is active hydrogen. Specific and preferred examples of the aromatic halides useful in the practice of the invention include halogenated aromatic compounds such as bromobenzene, α-bromonaphthalene, α-chloronaphthalene, 9-bromoanthracene, 9-iodoanthracene, 4-bromobiphenyl and the like, and halogenated heterocyclic compounds such as 2-bromothiophene, 2-chlorothiophene, 2-bromopyrrole, 2-bromo-3-hexylthiophene, 2-chloropyrrole, 2-chlorofuran, 2-bromofuran, and the like. Of these, 2-bromothiophene and 2-bromo-3-hexylthiophene are more preferable in view of the ease in preparation and good properties of final polymers obtained therefrom.

The aromatic compounds useful in the present invention should be those compounds which have an aromatic nucleus or aromatic nuclei which are directly bonded together or condensed and which have at least two active hydrogen atoms which are bonded to the aromatic nucleus or nuclei. The aromatic compounds may have substituents other than a halogen atom. Such substituents may include an alkyl group, an alkoxy group, a benzyl group and the like. The aromatic nucleus or nuclei are those mentioned with respect to the halogenated aromatic compounds and include, for example, those nuclei of benzene, biphenyl, naphthalene, anthracene, azulene, indole, thiophene, furan, pyrrole and the like with or without substituents other than halogens. The term "active hydrogen" used herein has substantially the same meaning as set out with respect to the halogenated aromatic compounds.

Specific and preferred examples of the aromatic compounds include benzene and derivatives thereof such as ethylbenzene, biphenyl and derivatives thereof such as 2,2'-dimethylbiphenyl, naphthalene and derivatives thereof such as α-methylnaphthalene, anthracene and derivatives thereof such as 2,6-dibutylanthracene, azulene and derivatives thereof, indole and derivatives thereof, thiophene and derivatives thereof such as 3-hexylthiophene, furan and derivatives thereof such as 3-benzylfuran, and pyrrole and derivatives thereof such as 3-methylpyrrole, and the like.

The polyhalogenated aromatic compounds or aromatic polyhalides useful in the present invention are those compounds which have an aromatic nucleus or nuclei directly bonded together or condensed and at least two halogen atoms bonded to the nucleus or nuclei with or without containing active hydrogen.

Specific and preferred examples of the aromatic polyhalides include 1,4-dibromobenzene, 2,6-dibromoanthracene, 2,5-dichlorothiophene, 2,5-dibromothiophene, 4,4'-dibromobiphenyl, 5,5'-dichlorobithiophene, 9,10-dibromoanthracene, and the like.

It should be noted that, in view of the definitions on the halogenated and polyhalogenated aromatic compounds, there are some compounds which belong to both the halogenated aromatic compounds and the polyhalogenated aromatic compounds, e.g. 1,4-dibromobenzene. These compounds may be used singly or in combination with an aromatic compound for the polycondensation reaction. It will also be noted that 2,5-dibromothiophene belongs to the category of the polyhalogenated aromatic compound, but not belonging to the halogenated aromatic compound in the sense of the above definitions.

Now, the condensation reaction by dehydrohalogenation reaction in the presence of a metal halide is illustrated in the following reaction sequence using a thiophene derivative as a halogenated aromatic compound.

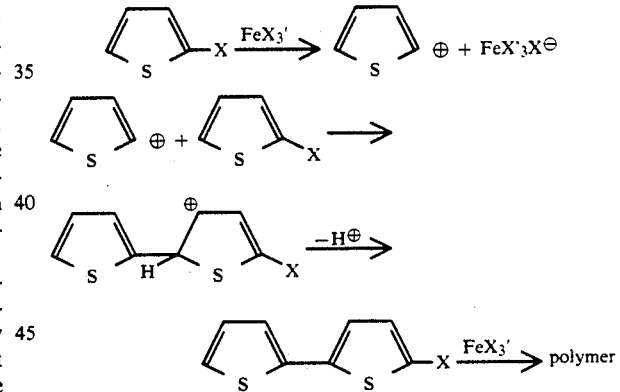

In the above formulae, X and X' independently represent a halogen such as Cl, Br or I.

In the above reactions, the thiophene derivative is converted into a thienyl ion by the action of the iron (II) halide. The thienyl ion electrophilically attacks other halogenated thiophene molecule to form a halogenated bithienyl molecule. The iron (II) halide again acts on the molecule to bring about an ionic species, which in turn electrophilically attacks other halogenated thiophene molecule, followed by repeating the above procedure to form a polymer. Thus, the polymerization reaction is caused by a simple reaction mechanism, so that there is only a reduced possibility that side reactions and/or polymerization termination reactions will take place. Presumably, this is the reason why an aromatic polymer compound having a high degree of polymerization can be readily obtained.

The polycondensation reaction between an aromatic compound and a polyhalogenated aromatic compound is considered to proceed similarly wherein active cationic species are caused to form and act on aromatic nuclei for electrophilic substitution or condensation reaction.

With the halogenated aromatic compounds or the aromatic compounds used in combination with polyhalogenated aromatic compounds, oligomers of the halogenated compounds or aromatic compounds may be used in the process of the invention. Typical examples of the oligomers include oligomers of the halogenated aromatic compounds such as α, α'-dibromoquaterthiophene, p,p'-dichloroterphenyl and the like, and oligomers of the aromatic compounds such as 2,5-thiophene oligomers. For instance, aromatic oligomers obtained by other processes may be subjected to condensation reaction with polyhalogenated aromatic compounds in the presence of a metal halide. In this technique, aromatic polymers of a higher degree of polymerization can be obtained.

The polycondensation reaction is generally effected in a solvent at wide temperatures of from −80° to 100° C., preferably not higher than 50° C. At higher temperatures within the above range, a higher degree of polymerization is attained. According to the process of the invention, the resultant polymer has generally a degree of polymerization of 100 or over, which may depend upon the reaction conditions or the type of metal halide catalyst. The solvent used in the process should be inert to the reaction system and includes, for example, chloroform, dichloroethane, nitrobenzene, 1,2-dichloroethane, and the like.

The reaction time is usually in the range of from 1 to 20 hours.

The polycondensation reaction should be effected in the presence of a metal halide which is ordinarily used in the Friedel-Crafts reaction. Examples of such metal halides include $AlCl_3$, $AlBr_3$, $SbCl_5$, $FeCl_3$, $SnCl_4$, $TiCl_4$, $WCl_6$, $MoCl_5$ and the like. These halides are used as a catalyst and are generally used in an amount of from 0.1 to 4 moles per mole of the starting material or materials.

A number of halogenated aromatic compounds and combinations of aromatic compounds and polyhalogenated aromatic compounds have been set out before, of which those starting compounds having a heterocyclic five-membered nucleus are more conveniently used for conversion into polymers according to the process of the invention. This is considered as follows: a heterocyclic five-membered compound such as a thiophene derivative is more active at opposite α positions of the hetero-atom. These compounds can produce aromatic polymer compounds with a higher degree of polymerization. Especially, aromatic linear polymers can be readily obtained by polycondensation reaction through dehydrohalogenation reaction of α-monohalogeno products of heterocyclic five-membered compounds or combinations of α, α'-dihalogeno products of heterocyclic five-membered compounds and heterocyclic five-membered compounds having active hydrogen atoms at the α, α' positions. Examples of the α-monohalogeno products of heterocyclic five-membered compounds include α-monohalogeno products of thiophene, pyrrole, furan, selenophene and tellurophene. The alpha-monohalogeno products may include α-monochloro, α-monobromo and α-monoiodo products. Moreover, examples of such combinations of α, α'-dihalogeno products of heterocyclic five-membered compounds and heterocyclic five-membered compounds having active hydrogen atoms at the α, α' positions include combinations of 2,5-dichlorothiophene and thiophene.

For obtaining aromatic linear polymer compounds having good solubility, heterocyclic five-membered compounds having a long alkyl side chain at the β position thereof are preferably used. Examples of such compounds include thiophene, pyrrole, furan, selenophene and tellurophene having an alkyl group having from 1 to 30 carbon atoms at the β position, e.g. 2-bromo-3-hexylthiophene and 2-chloro-3-butylpyrrole as the halogenated aromatic compound, and combinations of 3-hexylthiophene and/or 3-butylpyrrole and dibromo-3-hexylthiophene and/or 2,5-dichloro-3-butylpyrrole.

It will be noted that all the halogenated aromatic compounds, aromatic compounds and polyhalogenated aromatic compounds set forth hereinabove can be prepared by known techniques such as described in examples.

The present invention is more particularly described by way of examples.

EXAMPLE 1

0.01 mole (1.33 g) of aluminium chloride and 40 ml of chloroform were charged into a two-necked flask equipped with a dropping funnel and a condenser, after which 0.04 mole (6.52 g) of 2-bromothiophene was dropped into the flask through the dropping funnel while agitating with a stirrer.

When the agitation was continued for 1 hour, the solution was changed to dark blue in color. Thereafter, the reaction solution was heated and agitated under reflux for 4 hours.

The resultant reaction solution was charged into 400 ml of methanol, from which the resultant precipitate was collected by filtration and washed sufficiently with methanol to obtain about 2 g of a dark red powder.

This powder was subjected to IR spectroscopic analysis. The chart for this is shown in FIG. 1, from which the powder was confirmed to be poly(2,5-thiophene) having recurring units of the following formula

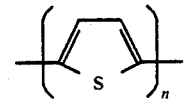

where n was about 100.

As will become apparent from FIG. 1, an absorption in the vicinity of 700 cm$^{-1}$ attributed to the C—H out-of-plane deformation vibration at the α position of the terminal thienyl group of the following formula

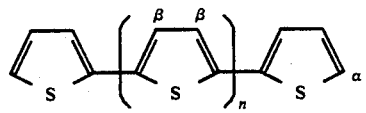

is significantly smaller than a corresponding absorption of polythiophene shown in Yamamoto et al's report (Bull. Chem. Soc. Jpn., 56, 1497 (1983). This means that the polymer of the invention contains polythienylene of a high degree of polymerization.

EXAMPLE 2

Figure 2:
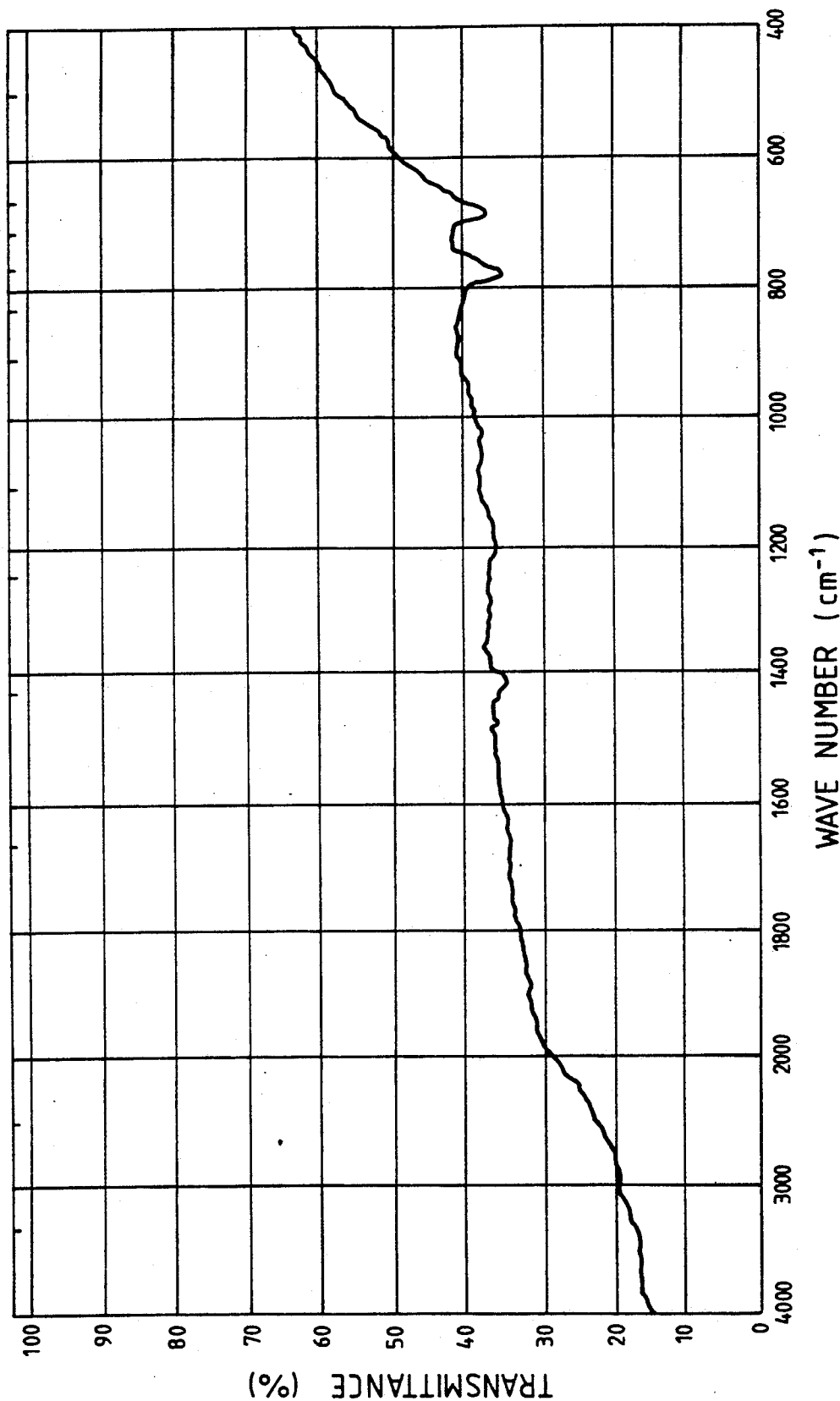

According to the method of Sugimoto et al (Chem. Express, 1, 635 (1986), 12 g of thiophene was added to a suspension of 1.5 g of iron (II) chloride in 30 ml of chloroform and agitated for about 4 hours. Thereafter, the reaction solution was added to 300 ml of methanol and the resultant precipitate was treated in the same manner as in Example 1 to obtain about 0.5 g of an orange powder. The results of the IR spectroscopic analysis of the powder are shown in FIG. 2. This figure reveals that absorptions at about 790 cm$^{-1}$ and 700 cm$^{-1}$, respectively, attribute to C—H out-of-plane deformation vibrations at the $\beta$ and $\alpha$ positions of (2,5-thiophene) oligomer.

Figure 3:
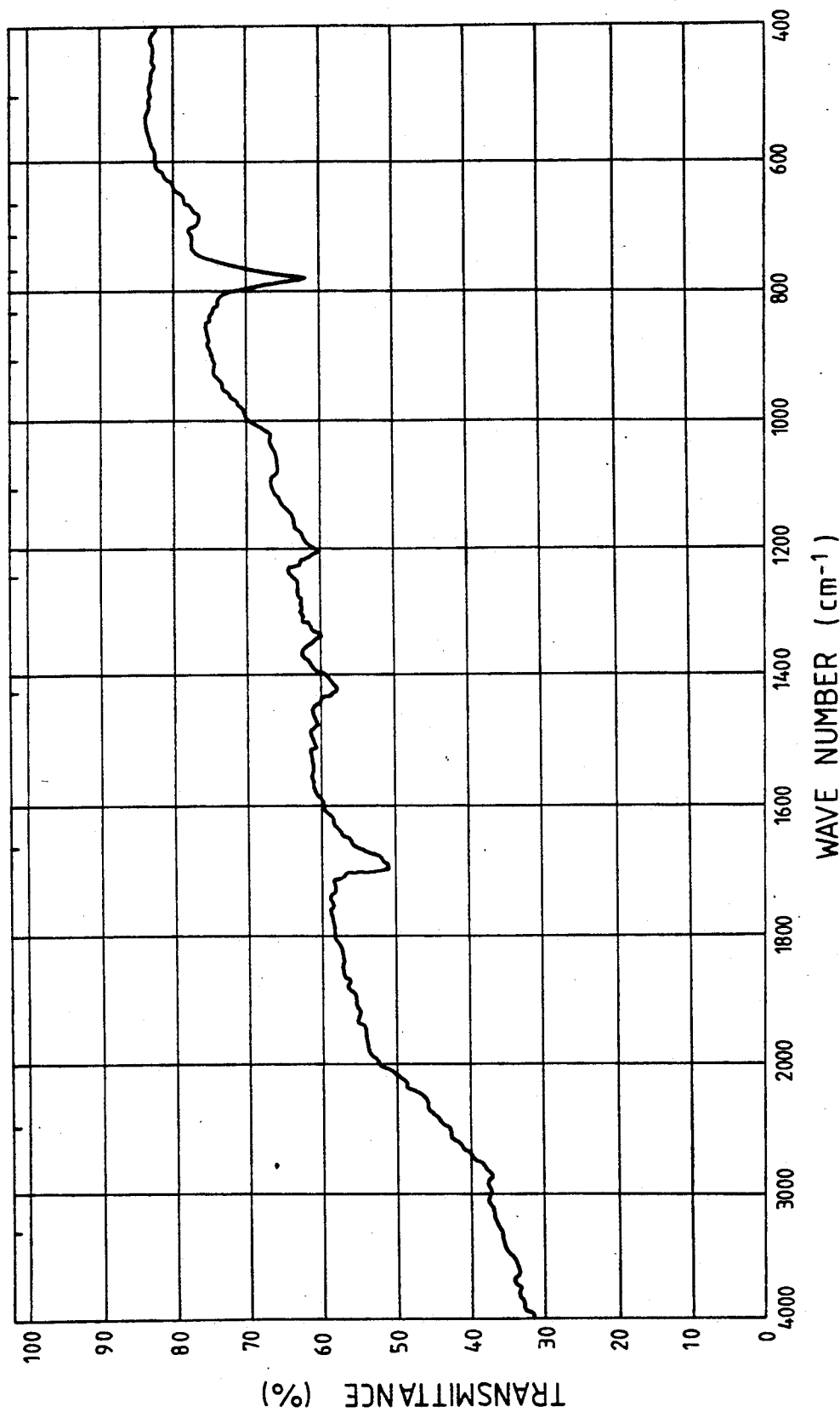

0.2 g of the oligomer was charged into 30 ml of chloroform along with 0.6 g of 2,5-dichlorothiophene and 0.8 g of iron (II) chloride, followed by agitation for 4 hours to obtain a dark red powder. This powder was collected by filtration and washed well with methanol, followed by IR spectroscopic analysis. The results are shown in FIG. 3. From the figure, an absorption strength at 700 cm$^{-1}$ attributed to the C—H out-of-plane deformation vibration at the $\alpha$ position for the terminal thiophene ring is significantly smaller than that of FIG. 2. This means formation of poly(2,5-thiophene) with a high degree of polymerization of about 100.

Further, 0.01 mole (1.62 g) of iron (II) chloride, 0.01 mole of 2,5-dichlorothiophene and 40 ml of chloroform were placed in a two-necked flask equipped with a dropping funnel and a condenser. Subsequently, 0.01 mole (0.84 g) of thiophene was dropped into the mixture through the dropping funnel while agitating with a stirrer. After completion of the dropping, the procedure of Example 1 was repeated to obtain about 1 g of a dark red powder. The powder was subjected to infrared spectroscopic analysis to obtain a chart similar to that of Example 3, from which the powder was confirmed to be poly(2,5-thiophene).

EXAMPLE 3

3-Hexylthiophene was obtained from 3-bromothiophene and n-hexyl magnesium bromide according to K. Tamao et al's technique described in Tetrahedron 38, 3347 (1982). The resultant product was brominated according to the method of A. Mckillop et al described in J. Org. Chem., 37, 88 (1972), thereby obtaining 2-bromo-3-hexylthiophene.

Subsequently, 0.01 mole (1.62 g) of iron (II) chloride and 40 ml of chloroform were added to a two-necked flask equipped with a dropping funnel and a condenser. While the mixture was agitated with a stirrer, 0.01 mole (2.47 g) of the 2-bromo-3-hexylthiophene was dropped into the mixture through the dropping funnel. Thereafter, the procedure of Example 1 was repeated to obtain about 1 g of a reddish brown powder. This powder was subjected to IR spectroscopic analysis, from which it was found that intense absorption peaks appeared in the vicinity of 820 cm$^{-1}$ and 3000 cm$^{-1}$. These absorptions, respectively, attributed to the C—H out-of-plane deformation vibration at the $\beta$ position of the thiophene ring and the C—H stretch vibration of the hexyl group, from which formation of poly(3-hexylthiophene) was confirmed.

EXAMPLE 4

The general procedure of Example 1 was repeated except that 2-bromopyrrole, 2-chlorofuran, 4-bromobiphenyl, $\alpha$-chloronaphthalene and 9-bromoanthracene were used instead of the 2-bromothiophene, thereby obtaining powders. The respective powders were subjected to IR spectroscopic analysis, from which formation of corresponding polymers was confirmed.

What is claimed is:

1. A process for producing a polymer compound having a degree of polymerization of about 100 or more, which comprises subjecting an aromatic heterocyclic compound having a five-membered nucleus and at least one active halogen atom directly bonded to the nucleus, to a dehydrohalogenation reaction in the presence of about 0.1 to 4 moles of metal halide per mole of starting material or materials, wherein said metal halide is selected from the group consisting of iron halides and aluminum halides, at a temperature of from −80° C. to 100° C. under such conditions sufficient to cause a condensation reaction of the halogenated starting material to obtain a polymer product comprising the halogenated aromatic compound.

2. A process for producing a polymer according to claim 1, wherein said polymer is a homopolymer from a starting material selected from the group consisting of halogenated thiophene, pyrrole, furan, selenophene and terullophene with or without additional substituents other than the required at least one halogen.

3. A process for producing a polymer according to claim 1, wherein the polymer is a copolymer of the heterocyclic 5-membered compound monomer and an additional monomer selected from the group consisting of halogenated benzene, biphenyl, naphthalene, anthracene, azulene and indole with or without substituents other than the required at least one halogen.

4. A process according to claim 1, wherein said halogenated heterocyclic five-membered compound is 2-bromothiophene.

5. A process according to claim 1, wherein said halogenated heterocyclic five-membered compound is 2-bromo-3-hexylthiophene.

6. A process according to claim 1, wherein said halogenated heterocyclic five-membered compound is an $\alpha$-monohalogeno product of the compound whereby the resultant polymer is a linear polymer.

7. A process according to claim 1, wherein said halogenated heterocyclic five-membered compound is a halogenated heterocyclic five-member compound having a long alkyl side chain having from 1 to 30 carbon atoms at the $\beta$ position thereof whereby the resultant polymer is linear in nature and has good solubility in solvent.

8. A process according to claim 1, wherein the temperature is not higher than 50° C.

* * * * *